(12) United States Patent
Snyder (10) Patent No.: US 12,098,678 B2
(45) Date of Patent: Sep. 24, 2024

(54) METHOD OF USING A PRIMARY FUEL TO PILOT LIQUID FUELED COMBUSTORS

(71) Applicant: RTX Corporation, Farmington, CT (US)

(72) Inventor: Timothy S. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 16/736,970

(22) Filed: Jan. 8, 2020

(65) Prior Publication Data
US 2021/0207541 A1    Jul. 8, 2021

(51) Int. Cl.
*F02C 7/228* (2006.01)
*F02C 7/232* (2006.01)
*F02C 9/26* (2006.01)

(52) U.S. Cl.
CPC .............. *F02C 7/228* (2013.01); *F02C 7/232* (2013.01); *F02C 9/263* (2013.01); *F05D 2220/323* (2013.01); *F05D 2270/303* (2013.01); *F23D 2900/00015* (2013.01); *F23K 2300/206* (2020.05); *F23N 2235/24* (2020.01)

(58) Field of Classification Search
CPC .. F02C 7/228; F02C 7/232; F02C 7/22; F02C 9/26; F02C 9/28; F02C 9/263; F23R 3/36; F23R 3/286; F23R 3/14; F23R 3/283

See application file for complete search history.

(56) References Cited

U.S. PATENT DOCUMENTS

| | | | |
|---|---|---|---|
| 3,912,164 | A | 10/1975 | Lefebvre et al. |
| 5,165,241 | A | 11/1992 | Joshi et al. |
| 5,218,824 | A | 6/1993 | Cederwall et al. |
| 5,303,554 | A | 4/1994 | Faulkner |

(Continued)

FOREIGN PATENT DOCUMENTS

| EP | 3450850 A1 | 3/2019 |
|---|---|---|
| WO | 2015122797 A1 | 8/2015 |
| WO | 2018168747 A1 | 9/2018 |

OTHER PUBLICATIONS

The Extended European Search Report for Application No. 21150751. 2-1009: Report dated May 25, 2021; Report dated Jun. 2, 2021; 7 pages.

(Continued)

*Primary Examiner* — Thuyhang N Nguyen
(74) *Attorney, Agent, or Firm* — CANTOR COLBURN LLP (57) ABSTRACT

A fuel delivery system for a combustor of a gas turbine engine including a primary fuel tank configured to store a primary fuel, a secondary fuel tank configured to store a secondary fuel, a swirler configured to produce a main flame within a combustion chamber of the combustor, and a fuel nozzle configured to produce a pilot flame within the combustion chamber of the combustor. The fuel nozzle includes a nozzle outlet that is located proximate to an end of the swirler or at the end of the swirler, the end of the swirler being located at an inlet of the combustor. The fuel delivery system also includes a primary fuel line fluidly connecting the primary fuel tank to the fuel nozzle and a secondary fuel line fluidly connecting the secondary fuel tank to the swirler.

20 Claims, 7 Drawing Sheets

(56) References Cited

U.S. PATENT DOCUMENTS

| | | | |
|---|---|---|---|
| 5,365,738 A | 11/1994 | Etheridge | |
| 5,394,685 A | 3/1995 | Kesten et al. | |
| 5,457,953 A | 10/1995 | Etheridge | |
| 5,467,926 A | 11/1995 | Idleman et al. | |
| 5,657,632 A | 8/1997 | Foss | |
| 5,865,024 A * | 2/1999 | Kress | F23R 3/14 60/39.463 |
| 6,176,087 B1 | 1/2001 | Snyder et al. | |
| 6,267,585 B1 | 7/2001 | Suttrop | |
| 6,532,726 B2 * | 3/2003 | Norster | F23C 7/002 60/39.281 |
| 6,813,890 B2 | 11/2004 | Martling et al. | |
| 7,162,864 B1 | 1/2007 | Scheder et al. | |
| 7,406,820 B2 * | 8/2008 | Critchley | F02C 9/26 60/39.281 |
| 9,182,124 B2 | 11/2015 | Oskam | |
| 9,222,414 B2 * | 12/2015 | Eto | F02C 3/28 |
| 9,464,573 B2 | 10/2016 | Remy et al. | |
| 9,476,357 B2 | 10/2016 | Owens | |
| 10,100,748 B2 * | 10/2018 | Kawai | B64D 37/30 |
| 11,725,818 B2 | 8/2023 | Snyder | |
| 2002/0162333 A1 * | 11/2002 | Zelina | F23R 3/286 60/737 |
| 2007/0044477 A1 | 3/2007 | Held et al. | |
| 2008/0271456 A1 * | 11/2008 | Scully | F02C 9/34 60/740 |
| 2009/0223226 A1 * | 9/2009 | Koizumi | F02C 7/232 60/737 |
| 2010/0071373 A1 | 3/2010 | Martin et al. | |
| 2012/0291444 A1 | 11/2012 | Oskam | |
| 2014/0090394 A1 | 4/2014 | Low et al. | |
| 2014/0332602 A1 | 11/2014 | Cramb et al. | |
| 2015/0135723 A1 | 5/2015 | Belyaev et al. | |
| 2015/0275755 A1 * | 10/2015 | Ogata | F23R 3/286 60/737 |
| 2015/0337739 A1 * | 11/2015 | Heiberger | F02C 9/263 60/734 |
| 2015/0362194 A1 | 12/2015 | Ogata et al. | |
| 2016/0123226 A1 | 5/2016 | Razak et al. | |
| 2016/0305327 A1 * | 10/2016 | Patel | F23R 3/14 |
| 2017/0298884 A1 * | 10/2017 | Patel | F02M 61/16 |
| 2017/0299190 A1 | 10/2017 | Patel et al. | |
| 2017/0350598 A1 * | 12/2017 | Boardman | F23R 3/14 |
| 2019/0137105 A1 | 5/2019 | Seok | |
| 2020/0033006 A1 | 1/2020 | Miyamoto et al. | |
| 2021/0172413 A1 | 6/2021 | Snyder | |

OTHER PUBLICATIONS

Communication pursuant to Article 94(3) EPC dated Dec. 15, 2022; EP Application No. 21150751.2; 5 pages.

Extended EP Search Report dated May 7, 2021; EP Application No. 20212219.8; 7 pages.

EPO Office Action corresponding to EP Application No. 21150751.2; Mailing Date, Nov. 7, 2023.

* cited by examiner

METHOD OF USING A PRIMARY FUEL TO PILOT LIQUID FUELED COMBUSTORS

BACKGROUND

The subject matter disclosed herein generally relates to gas turbine engines and, more particularly, to an apparatus and method for fueling combustors of gas turbine engines.

In one example, a combustor of a gas turbine engine may be configured to burn a single type of fuel in a combustion area.

SUMMARY

According to an embodiment, a fuel delivery system for a combustor of a gas turbine engine is provided. The fuel delivery system including a primary fuel tank configured to store a primary fuel, a secondary fuel tank configured to store a secondary fuel, a swirler configured to produce a main flame within a combustion chamber of the combustor, and a fuel nozzle configured to produce a pilot flame within the combustion chamber of the combustor. The fuel nozzle includes a nozzle outlet that is located proximate to an end of the swirler or at the end of the swirler, the end of the swirler being located at an inlet of the combustor. The fuel delivery system also includes a primary fuel line fluidly connecting the primary fuel tank to the fuel nozzle and a secondary fuel line fluidly connecting the secondary fuel tank to the swirler.

In addition to one or more of the features described above, or as an alternative, further embodiments may include a secondary fuel pilot line fluidly connecting the secondary fuel tank to the fuel nozzle and a pilot fuel selection valve located within the primary fuel line and the secondary fuel pilot line. The pilot fuel selection valve being configured to be actuated to one or more positions to adjust a flow to the fuel nozzle of at least one of the primary fuel and the secondary fuel.

In addition to one or more of the features described above, or as an alternative, further embodiments may include a combined pilot fuel line fluidly connecting the pilot fuel selection valve to the fuel nozzle. The primary fuel line and the secondary fuel pilot line are combined into the combined pilot fuel line between the pilot fuel selection valve and the fuel nozzle.

In addition to one or more of the features described above, or as an alternative, further embodiments may include that the fuel delivery system is a passive system and configured to adjust the position of the pilot fuel selection valve based upon a schedule of operating conditions.

In addition to one or more of the features described above, or as an alternative, further embodiments may include a logic controller including one or more sensors configured to detect operation conditions of the gas turbine engine. The logic controller being in electronic communication with the pilot fuel selection valve. The fuel delivery system is an active feedback system and configured to adjust the position of the pilot fuel selection valve based upon a detection of operating conditions using the logic controller.

In addition to one or more of the features described above, or as an alternative, further embodiments may include a secondary fuel control valve located within the secondary fuel pilot line between the second fuel secondary fuel tank and the pilot fuel selection valve. The secondary fuel control valve being configured to be actuated to one or more positions to adjust the flow of the secondary fuel to the pilot fuel selection valve.

In addition to one or more of the features described above, or as an alternative, further embodiments may include a combined pilot fuel line fluidly connecting the pilot fuel selection valve to the fuel nozzle. The primary fuel line and the secondary fuel pilot line are combined into the combined pilot fuel line between the pilot fuel selection valve and the fuel nozzle.

In addition to one or more of the features described above, or as an alternative, further embodiments may include that the fuel delivery system is a passive system and configured to adjust the position of the pilot fuel selection valve based upon a schedule of operating conditions.

In addition to one or more of the features described above, or as an alternative, further embodiments may include a logic controller including one or more sensors configured to detect operation conditions of the gas turbine engine. The logic controller being in electronic communication with the pilot fuel selection valve. The fuel delivery system is an active feedback system and configured to adjust the position of the pilot fuel selection valve based upon a detection of operating conditions using the logic controller.

In addition to one or more of the features described above, or as an alternative, further embodiments may include that the logic controller is in electronic communication with the secondary fuel control valve and configured to adjust the position of the secondary fuel control valve based upon a detection of operating conditions.

According to another embodiment, a method of delivering fuel to a combustor of a gas turbine engine is provided. The method including that a primary fuel is stored in a primary fuel tank, a secondary fuel is stored in a secondary fuel tank, a swirler produces a main flame within a combustion chamber of the combustor, and a fuel nozzle produces a pilot flame within the combustion chamber of the combustor. The fuel nozzle includes a nozzle outlet that is located proximate to an end of the swirler or at the end of the swirler, the end of the swirler being located at an inlet of the combustor. The method further includes that a primary fuel line conveys the primary fuel from the primary fuel tank to the fuel nozzle and a secondary fuel line conveys the secondary fuel from the secondary fuel tank to the swirler.

In addition to one or more of the features described above, or as an alternative, further embodiments may include that a secondary fuel pilot line conveys the secondary fuel from the secondary fuel tank to the fuel nozzle and a pilot fuel selection valve adjusts a flow to the fuel nozzle of at least one of the primary fuel and the secondary fuel.

In addition to one or more of the features described above, or as an alternative, further embodiments may include that a combined pilot fuel line conveys at least one of the primary fuel and the secondary fuel from the pilot fuel selection valve to the fuel nozzle. The primary fuel line and the secondary fuel pilot line are combined into the combined pilot fuel line between the pilot fuel selection valve and the fuel nozzle.

In addition to one or more of the features described above, or as an alternative, further embodiments may include that a position of the pilot fuel selection valve is adjusted based upon a schedule of operating conditions. The fuel delivery system is a passive system.

In addition to one or more of the features described above, or as an alternative, further embodiments may include that a logic controller adjusts a position of the pilot fuel selection valve based upon detection of operating conditions. The logic controller including one or more sensors configured to detect operation conditions of the gas turbine engine.

In addition to one or more of the features described above, or as an alternative, further embodiments may include that a secondary fuel control valve adjusts a flow of the secondary fuel between the second fuel secondary fuel tank and the pilot fuel selection valve.

In addition to one or more of the features described above, or as an alternative, further embodiments may include that a combined pilot fuel line conveys at least one of the primary fuel and the secondary fuel from the pilot fuel selection valve to the fuel nozzle. The primary fuel line and the secondary fuel pilot line are combined into the combined pilot fuel line between the pilot fuel selection valve and the fuel nozzle.

In addition to one or more of the features described above, or as an alternative, further embodiments may include that a position of the pilot fuel selection valve is adjusted based upon a schedule of operating conditions.

In addition to one or more of the features described above, or as an alternative, further embodiments may include that a logic controller adjusts a position of the pilot fuel selection valve based upon detection of operating conditions. The logic controller including one or more sensors configured to detect operation conditions of the gas turbine engine.

In addition to one or more of the features described above, or as an alternative, further embodiments may include that a logic controller adjusts a position of the secondary fuel control valve based upon detection of operating conditions, the logic controller including one or more sensors configured to detect operation conditions of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
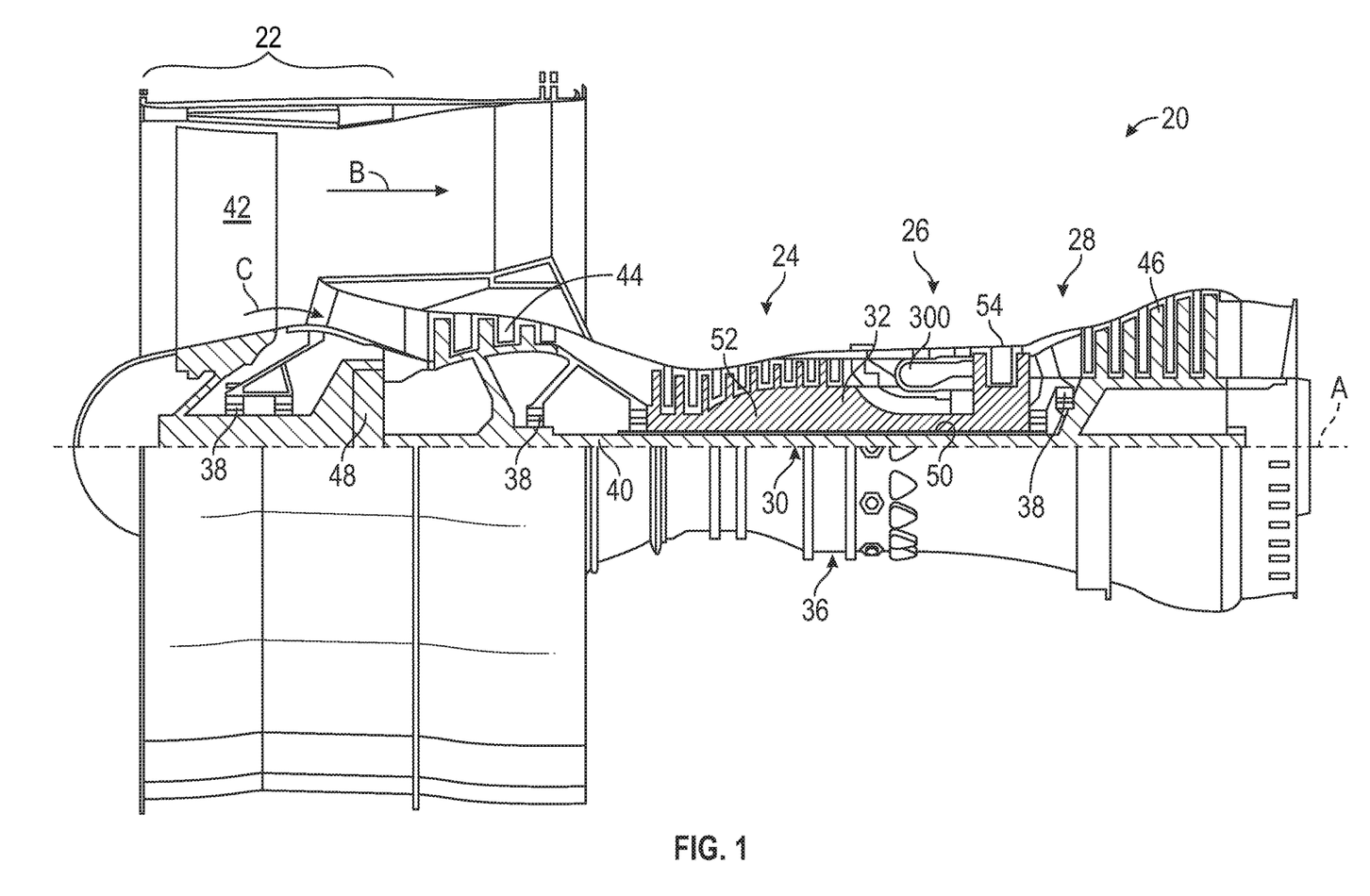
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2A:
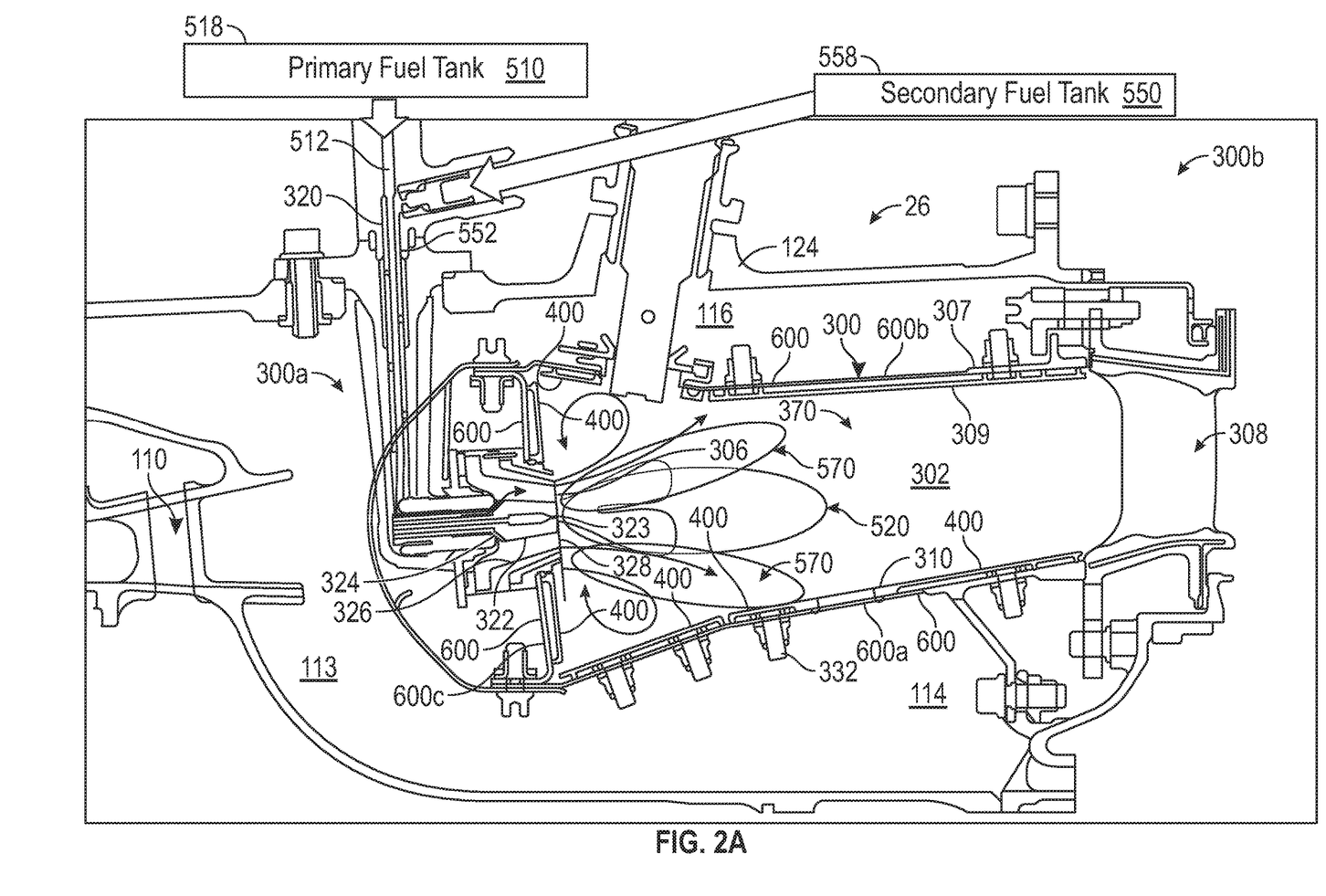
FIG. 2A is a cross-sectional illustration of a combustor, in accordance with an embodiment of the present disclosure.
Figure 2B:
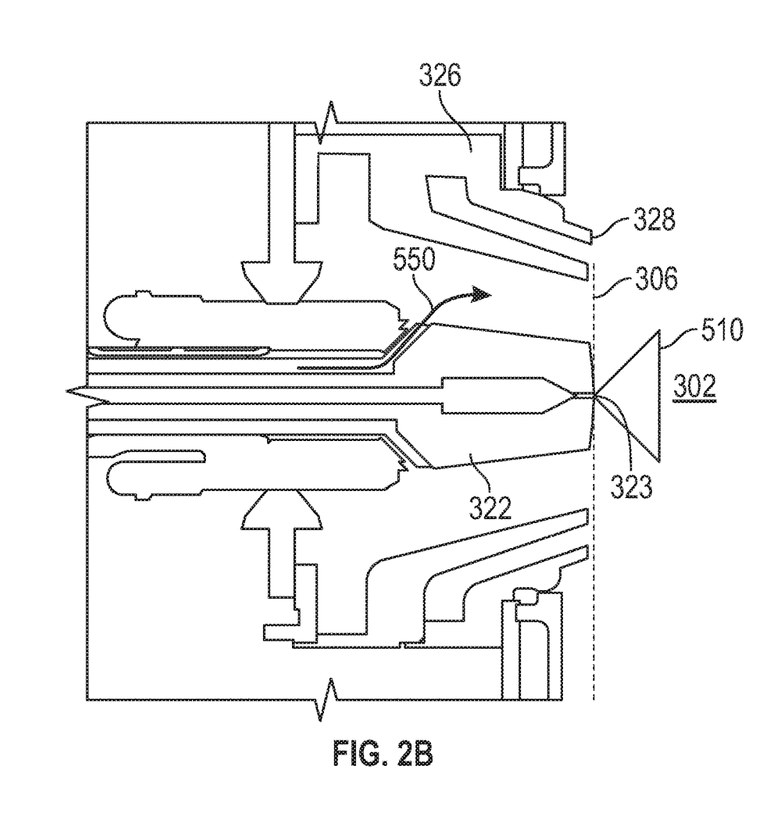
FIG. 2B is an enlarged cross-sectional illustration of the combustor of FIG. 2A showing a fuel nozzle located at the inlet of the combustor, in accordance with an embodiment of the present disclosure.

Referring now to FIG. 2A and FIG. 2B, with continued reference to FIG. 1, the combustor section 26 of the gas turbine engine 20 is illustrated in accordance with an embodiment of the present disclosure. The combustor 300 of FIGS. 2A and 2B is an impingement film float wall combustor. It is understood that while an impingement film float wall combustor is utilized for exemplary illustration, the embodiments disclosed herein may be applicable to other types of combustors for gas turbine engines including but not limited to double pass liner combustors, float wall combustors, and combustors with single wall liners. FIG. 2B is an enlarged illustration of a fuel nozzle 322 of the combustor 300 of FIG. 2A.

As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2A.

Compressor air is supplied from the compressor section 24 into a pre-diffuser 110, which then directs the airflow toward the combustor 300. The combustor 300 and the pre-diffuser 110 are separated by a dump region 113 from which the flow separates into an inner shroud 114 and an outer shroud 116. As air enters the dump region 113, a portion of the air may flow into the combustor inlet 306, a portion may flow into the inner shroud 114, and a portion may flow into the outer shroud 116.

The air from the inner shroud 114 and the outer shroud 116 may then enter the combustion chamber 302 by means of one or more primary apertures 307 in the shell 600 and one or more secondary apertures 309, as shown in FIG. 2. The primary apertures 307 and secondary apertures 309 may include nozzles, holes, etc. The air may then exit the combustion chamber 302 through the combustor outlet 308. At the same time, fuel may be injected into the combustion chamber 302 through the primary and/or secondary orifices of a fuel nozzle 322 of a fuel injector system 320, which may be atomized and mixed with air, and then ignited and burned within the combustion chamber 302. The combustor 300 of the engine combustion section 26 may be housed within diffuser case 124 which may define the inner shroud 114 and the outer shroud 116. The combustor 300 is housed within the diffuser case 124 between the inner shroud 114 and the outer shroud 116.

The combustor 300, as shown in FIG. 2A, includes multiple heat shield panels 400 that are attached to one or more shells 600. The heat shield panels 400 may be arranged parallel to the shell 600. The shell 600 includes a radially inward shell 600a and a radially outward shell 600b in a facing spaced relationship defining the combustion chamber 302 therebetween. The shell 600 also includes a forward shell 600c extending between the radially inward shell 600a and the radially outward shell 600b. The forward shell 600c further bounds the combustion chamber 302 on a forward end 300a of the combustor 300. The radially inward shell 600a and the radially outward shell 600b extend circumferentially around the longitudinal engine axis A. The radially inward shell 600a is located radially inward from the radially outward shell 600b.

The heat shield panels 400 can be removably mounted to the shell 600 by one or more attachment mechanisms 332. In some embodiments, the attachment mechanism 332 may be integrally formed with a respective heat shield panel 400, although other configurations are possible. In some embodiments, the attachment mechanism 332 may be a threaded mounting stud or other structure that may extend from the respective heat shield panel 400 through the interior surface to a receiving portion or aperture of the shell 600 such that the heat shield panel 400 may be attached to the shell 600 and held in place. The heat shield panels 400 partially enclose a combustion area 370 within the combustion chamber 302 of the combustor 300.

The fuel nozzle 322 (i.e., blunt body stabilized fuel injector) replaces a pilot nozzle that is typically utilized in a conventional combustor. The fuel nozzle 322 may be utilized specifically with a combustor that burns two fuels as described herein. The two fuels may include but are not limited to a primary fuel 510 and a secondary fuel 550. The primary fuel 510 may be stored in a primary fuel tank 518 and the secondary fuel 550 may be stored in a secondary fuel tank 558. The primary fuel tank 518 is configured to store the primary fuel 510 and the secondary fuel tank 558 is configured to store the secondary fuel 550. In an embodiment, the primary fuel 510 may be hydrogen and the secondary fuel 550 may be jet A. The hydrogen may be between about 0.5% and 2% of the fuel mixture and the jet A may be about 98% of the fuel mixture. It is understood that the embodiments disclosed herein may be applicable to any percentage composition of fuel based upon the type primary fuel 510 being used. The hydrogen may be a liquid hydrogen or gaseous hydrogen. In another embodiment, the primary fuel 510 may be liquid hydrogen and the secondary fuel 550 may be gaseous hydrogen. In another embodiment, the secondary fuel 550 may be natural gas.

The primary fuel 510 is conveyed to the fuel nozzle 322 through a primary fuel line 512 of the fuel injector system 320. The primary fuel tank 518 is fluidly connected to the fuel nozzle 322 through the primary fuel line 512. The secondary fuel 550 is conveyed to the fuel nozzle 322 through a secondary fuel line 552 of the fuel injector system 320. The secondary fuel tank 558 is fluidly connected to at least one of the swirler 326 and the fuel nozzle 322 through the secondary fuel line 552. The primary fuel line 512 provides the primary fuel 510 to the fuel nozzle 322 that is configured to produce a pilot flame 520 within the combustion chamber 302. The secondary fuel line 552 provides the secondary fuel 550 to swirler 326 to produce a main flame 570 within the combustion chamber 302. The fuel nozzle 322 is located within the swirler 326. In other words, the swirler 326 extends around or encircles the fuel nozzle 322. The secondary fuel 550 is injected into the swirler 326 at a secondary fuel injection point 324 located forward of an end 328 of a swirler 326.

The fuel nozzle 322 comprises a nozzle outlet 323 that is located proximate to the end 328 of a swirler 326 or at the end 328 of the swirler 326. The end 328 is located at the inlet 306 of the combustor 300. Advantageously, by extending the fuel nozzle 322 to the end 328, this prevents the pilot flame, fueled by the primary fuel 510, from pulsing in and out from the fuel nozzle 322. In other words, by extending the fuel nozzle 322 to the end 328, this prevents the pilot flame, fueled by the primary fuel 510, from pulsing forward toward the forward end 300a of the combustor 300 and rearward towards a rearward end 300b of the combustor 300.

Figure 2C:
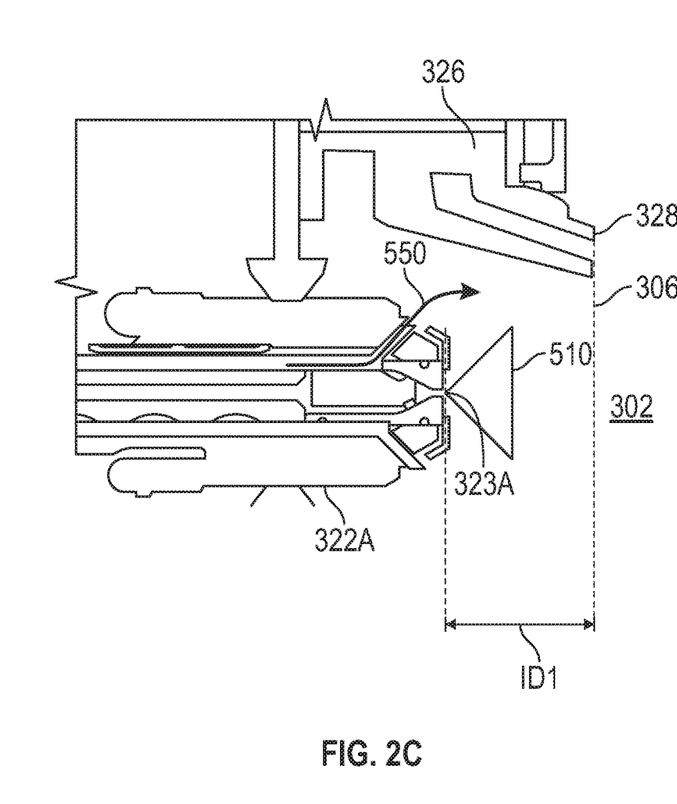
FIG. 2C is an enlarged cross-sectional illustration of a combustor utilizing a fuel nozzle located at an immersion distance away from an inlet of the combustor.

Referring briefly to FIG. 2C in comparison to FIG. 2B. FIG. 2C illustrates a recessed fuel nozzle 322A. The recessed fuel nozzle 322A of FIG. 2C is shown to illustrate the difference between the recessed fuel nozzle 322A of FIG. 2C and the fuel nozzle 322 of FIG. 2B. The recessed fuel nozzle 322A comprises a nozzle outlet 323A that is not located proximate to the end 328 of the swirler 326 and is not located at the end 328 of the swirler 326. The nozzle outlet 323A is located at an immersion distance ID1 away from the end 328 of the swirler 326. The end 328 is located at the inlet 306 of the combustor 300, or more specifically the combustion chamber 302.

When using the recessed fuel nozzle 322A of FIG. 2C both the secondary fuel 550 and the primary fuel 510 is injected inside the swirler 326 to allow mixing of the secondary fuel 550, the primary fuel 510, and air inside swirler 326 prior to entering the inlet 306. This is as opposed to the fuel nozzle of FIG. 2B, which comprises a nozzle outlet 323 locate proximate or at the inlet 306 so that the primary fuel 510 is injected directly into the combustion area 302 while the secondary fuel 550 continues to mix with air inside the swirler 326 before entering the combustion area 302.

Figure 3A:
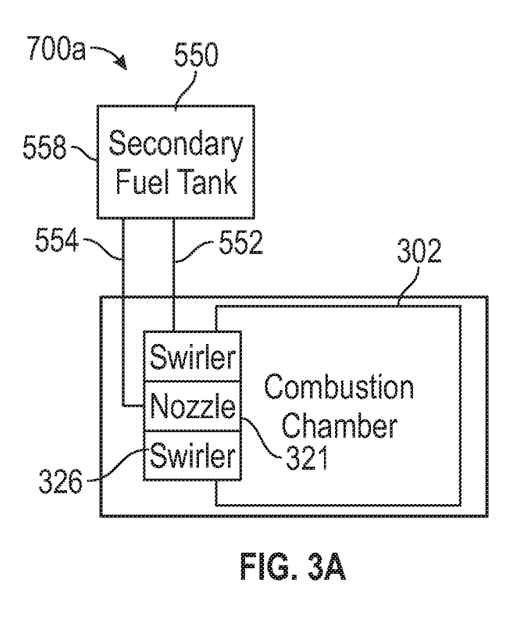
FIG. 3A is a schematic illustration of a conventional fuel delivery system.
Figure 3B:
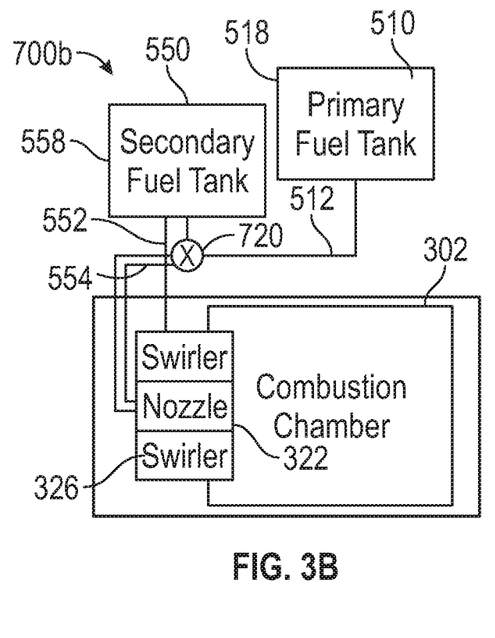
FIG. 3B is a schematic illustration of a passive fuel delivery system, in accordance with an embodiment of the present disclosure.
Figure 3C:
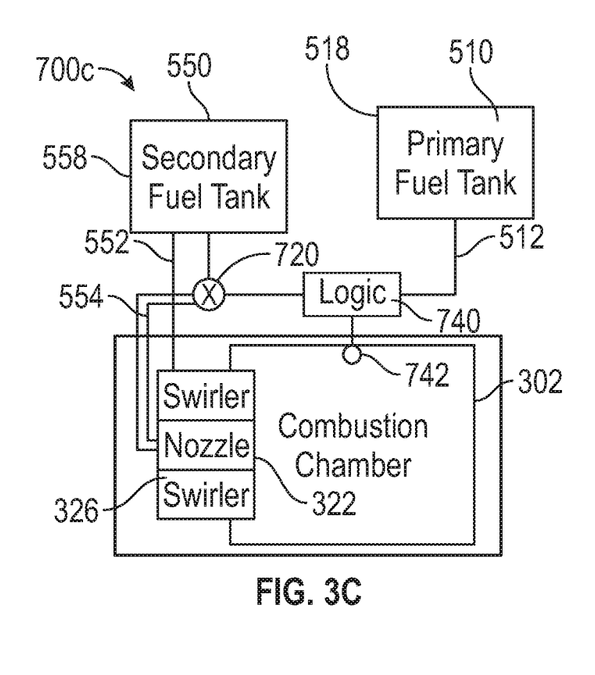
FIG. 3C is a schematic illustration of an active feedback fuel delivery system, in accordance with an embodiment of the present disclosure.

Referring now to FIGS. 3A, 3B, and 3C, with continued reference to FIGS. 1, 2A and 2B, various fuel delivery systems 700a, 700b, 700c are illustrated, according to an embodiment of the present disclosure. It is understood that the fuel delivery system 700a, 700b, 700c may comprise various other components that are not illustrated herein for simplicity, such as, for example, fuel pumps, metering devices, or any other device known to one of skill in the art to control and measure fuel flow, which may also provide additional data to the logic controller 740 illustrated herein.

FIG. 3A illustrates a conventional design of a fuel delivery system 700a that only utilizes the secondary fuel 550. The secondary fuel 550 in the fuel delivery system 700a is supplied to both the swirler 326 and a pilot nozzle 321. The secondary fuel 550 is conveyed to the pilot nozzle 321 through a secondary fuel pilot line 554. The secondary fuel 550 is conveyed to the swirler 326 through the secondary fuel line 552.

FIG. 3B illustrates a fuel delivery system 700b that utilizes the primary fuel 510 and the secondary fuel 550 as in FIG. 2A. The primary fuel 510 in the fuel delivery system 700b is supplied to the fuel nozzle 322 through the primary fuel line 512. The secondary fuel 550 in the fuel delivery system 700b is supplied to the swirler 326 through the secondary fuel line 552. The fuel delivery system 700b of FIG. 3B also includes a secondary fuel pilot line 554 that conveys the secondary fuel 550 to the fuel nozzle 322.

A pilot fuel selection valve 720 located within the primary fuel line 512 and the secondary fuel pilot line 554 and may be configured to be actuated to one or more positions to adjust the flow to the fuel nozzle 322 of at least one of the primary fuel 510 and the secondary fuel 550. In an embodiment, the pilot fuel selection valve 720 may be actuated to a primary fuel position that is configured to allow only the primary fuel 510 to flow to the fuel nozzle 322. No secondary fuel 550 will flow to the fuel nozzle 322 when the pilot fuel selection valve 720 is in the primary fuel position. The primary fuel position may be used during operation of the gas turbine engine 20 when enhanced stability of the combustor is required, such as, for example, combustor efficiency, emissions control, altitude ignition, control combustion dynamics, or lean blowout. In an embodiment, the pilot fuel selection valve 720 may be actuated to a secondary fuel position that is configured to allow only the secondary fuel 550 to flow to the fuel nozzle 322. No primary fuel 510 will flow to the fuel nozzle 322 when the pilot fuel selection valve 720 is in the secondary fuel position. The secondary fuel position may be used to purge the fuel nozzle 322 of the primary fuel 510. It is understood that the pilot fuel selection valve 720 is not limited to the primary fuel position and the secondary fuel position and thus may be actuated to any position between the primary fuel position and the secondary fuel position.

The pilot fuel selection valve 720 may be modulated between the primary fuel position and the secondary fuel position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 700b of FIG. 3B is a passive system and may be configured to adjust the position of the pilot fuel selection valve 720 based upon a schedule of operating conditions.

FIG. 3C illustrates a fuel delivery system 700b that utilizes the primary fuel 510 and the secondary fuel 550 as in FIG. 2A. The primary fuel 510 in the fuel delivery system 700b is supplied to the fuel nozzle 322 through the primary fuel line 512. The secondary fuel 550 in the fuel delivery system 700b is supplied to the swirler 326 through the secondary fuel line 552. The fuel delivery system 700b of FIG. 3C also includes a secondary fuel pilot line 554 that conveys the secondary fuel 550 to the fuel nozzle 322.

A pilot fuel selection valve 720 located within the primary fuel line 512 and the secondary fuel pilot line 554 and may be configured to be actuated to one or more positions to adjust the flow to the fuel nozzle 322 of at least one of the primary fuel 510 and the secondary fuel 550. In an embodiment, the pilot fuel selection valve 720 may be actuated to a primary fuel position that is configured to allow only the primary fuel 510 to flow to the fuel nozzle 322. No secondary fuel 550 will flow to the fuel nozzle 322 when the pilot fuel selection valve 720 is in the primary fuel position. The primary fuel position may be used during operation of the gas turbine engine 20 when enhanced stability of the combustor is required, such as, for example, combustor efficiency, emissions control, altitude ignition, control combustion dynamics, or lean blowout. In an embodiment, the pilot fuel selection valve 720 may be actuated to a secondary fuel position that is configured to allow only the secondary fuel 550 to flow to the fuel nozzle 322. No primary fuel 510 will flow to the fuel nozzle 322 when the pilot fuel selection valve 720 is in the secondary fuel position. The secondary fuel position may be used to purge the fuel nozzle 322 of the primary fuel 510. It is understood that the pilot fuel selection valve 720 is not limited to the primary fuel position and the secondary fuel position and thus may be actuated to any position between the primary fuel position and the secondary fuel position.

The pilot fuel selection valve 720 may be modulated between the primary fuel position and the secondary fuel position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 700c of FIG. 3C is an active feedback system and may be configured to adjust the position of the pilot fuel selection valve 720 based upon a detection of operating conditions using a logic controller 740. The logic controller 740 may include one or more sensors 742 configured to detect operating conditions of the gas turbine engine 20 and/or operating conditions specifically of the combustion chamber 302.

The logic controller 740 may be in electronic communication with the pilot fuel selection valve 720. The logic controller 740 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 4A:
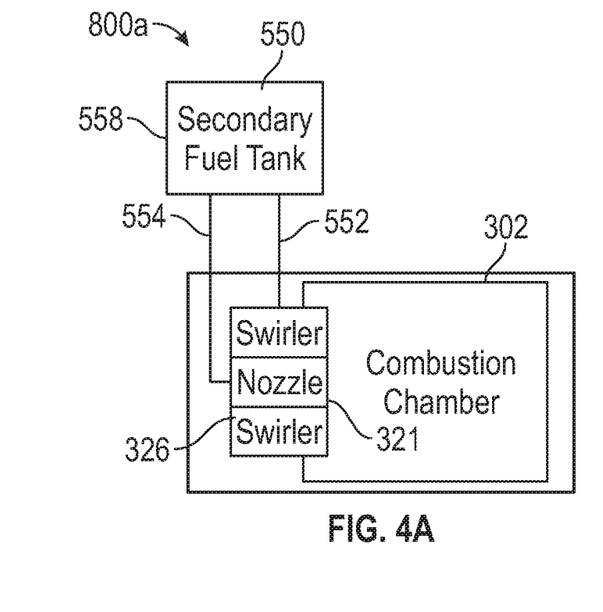
FIG. 4A is a schematic illustration of a conventional fuel delivery system.
Figure 4B:
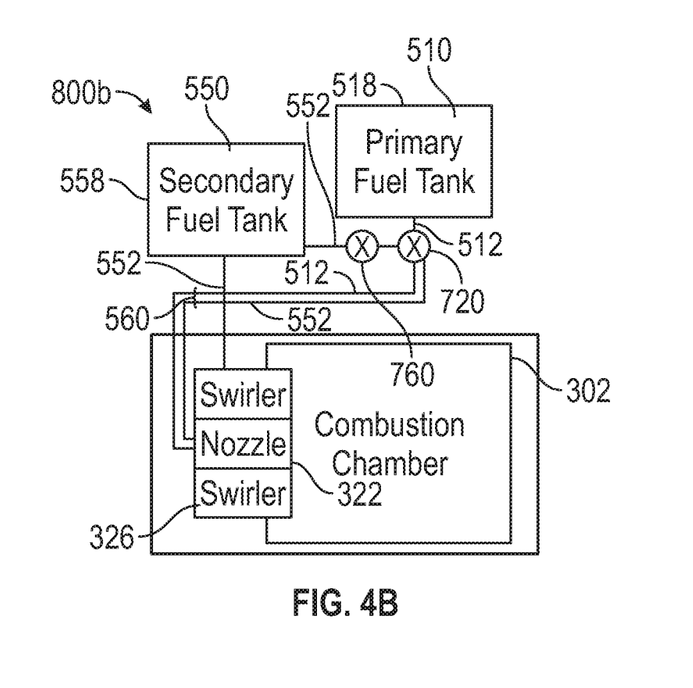
FIG. 4B is a schematic illustration of a passive fuel delivery system, in accordance with an embodiment of the present disclosure.
Figure 4C:
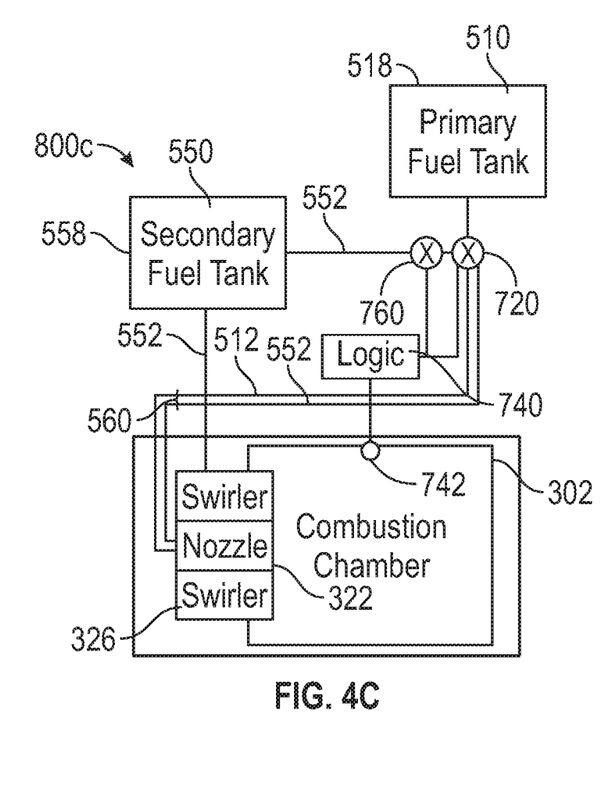
FIG. 4C is a schematic illustration of an active feedback fuel delivery system, in accordance with an embodiment of the present disclosure.

Referring now to FIGS. 4A, 4B, and 4C, with continued reference to FIGS. 1, 2A, 2B, 3B, and 3C, various fuel delivery systems 800a, 800b, 800c are illustrated, according to an embodiment of the present disclosure. It is understood that the fuel delivery system 700a, 700b, 700c may comprise various other components that are not illustrated herein for simplicity, such as, for example, fuel pumps, metering devices, or any other device known to one of skill in the art to control and measure fuel flow, which may also provide additional data to the logic controller 740 illustrated herein.

FIG. 4A illustrates a conventional design of a fuel delivery system 800a that only utilizes the secondary fuel 550. The secondary fuel 550 in the fuel delivery system 800a is supplied to both the swirler 326 and a pilot nozzle 321. The secondary fuel 550 is conveyed to the pilot nozzle 321 through a secondary fuel pilot line 554. The secondary fuel 550 is conveyed to the swirler 326 through the secondary fuel line 552.

FIG. 4B illustrates a fuel delivery system 800b that utilizes the primary fuel 510 and the secondary fuel 550 as in FIG. 2A. The primary fuel 510 in the fuel delivery system 800b is supplied to the fuel nozzle 322 through the primary fuel line 512. The secondary fuel 550 in the fuel delivery system 800b is supplied to the swirler 326 through the secondary fuel line 552. The fuel delivery system 800b of FIG. 4B also includes a secondary fuel pilot line 554 that conveys the secondary fuel 550 to the fuel nozzle 322.

A pilot fuel selection valve 720 located within the primary fuel line 512 and the secondary fuel pilot line 554 and may be configured to be actuated to one or more positions to adjust the flow to the fuel nozzle 322 of at least one of the primary fuel 510 and the secondary fuel 550. The pilot fuel selection valve 720 may be located proximate a primary fuel tank 518 in order to minimize or reduce the length of the primary fuel line 512 between the primary fuel tank 518 and the pilot fuel selection valve 720. In an embodiment, the pilot fuel selection valve 720 may be actuated to a primary fuel position that is configured to allow only the primary fuel 510 to flow to the fuel nozzle 322. No secondary fuel 550 will flow to the fuel nozzle 322 when the pilot fuel selection valve 720 is in the primary fuel position. The primary fuel position may be used during operation of the gas turbine engine 20 when enhanced stability of the combustor is required, such as, for example, combustor efficiency, emissions control, altitude ignition, control combustion dynamics, or lean blowout. In an embodiment, the pilot fuel selection valve 720 may be actuated to a secondary fuel position that is configured to allow only the secondary fuel 550 to flow to the fuel nozzle 322. No primary fuel 510 will flow to the fuel nozzle 322 when the pilot fuel selection valve 720 is in the secondary fuel position. It is understood that the pilot fuel selection valve 720 is not limited to the primary fuel position and the secondary fuel position and thus may be actuated to any position between the primary fuel position and the secondary fuel position.

In an embodiment, the primary fuel line 512 and the secondary fuel pilot line 554 may be combined into a combined pilot fuel line 560 between the pilot fuel selection valve 720 and the fuel nozzle 322. The combined pilot fuel line 560 fluidly connects the pilot fuel selection valve 720 to the fuel nozzle 322. The secondary fuel position may be used to purge the combined pilot fuel line 560 of the primary fuel 510. Advantageously, since the pilot fuel selection valve 720 is located proximate the primary fuel tank 518, the combined pilot fuel line 560 accounts for a majority of the primary fuel line 512. Therefore, when the pilot fuel selection valve 720 is actuated to the secondary fuel position and the secondary fuel 550 purges the combined pilot fuel line 560 and the majority, if not all, of the primary fuel 510 is removed from the primary fuel line 512.

The pilot fuel selection valve 720 may be modulated between the primary fuel position and the secondary fuel position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 800b of FIG. 4B is a passive system and may be configured to adjust the position of the pilot fuel selection valve 720 based upon a schedule of operating conditions.

The fuel delivery system 800b may also include the secondary fuel control valve 760 that is located within the secondary fuel pilot line 554 between the pilot fuel selection valve 720 and the second fuel secondary fuel tank 558. The secondary fuel control valve 760 may be configured to be actuated to one or more positions to adjust the flow of the secondary fuel 550 to the pilot fuel selection valve 720. The pilot fuel selection valve 720 may be located proximate the secondary fuel tank 558 in order to minimize or reduce the length of the secondary fuel line 552 between the secondary fuel tank 558 and the secondary fuel control valve 760. In an embodiment, the secondary fuel control valve 760 may be actuated to a secondary fuel on position that is configured to allow the secondary fuel 550 to flow the pilot fuel selection valve 720. In an embodiment, the secondary fuel control valve 760 may be actuated to a secondary fuel off position that is configured to prevent the secondary fuel 550 from flowing to the pilot fuel selection valve 720. It is understood that the secondary fuel control valve 760 is not limited to the secondary fuel on position and the secondary fuel off position and thus may be actuated to any position between the secondary fuel on position and the secondary fuel off position.

The secondary fuel control valve 760 may be modulated to the secondary fuel on position and the secondary fuel off position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 800b of FIG. 4B is a passive system and may be configured to adjust the position of the secondary fuel control valve 760 based upon a schedule of operating conditions.

FIG. 4C illustrates a fuel delivery system 800b that utilizes the primary fuel 510 and the secondary fuel 550 as in FIG. 2A. The primary fuel 510 in the fuel delivery system 800b is supplied to the fuel nozzle 322 through the primary fuel line 512. The secondary fuel 550 in the fuel delivery system 800b is supplied to the swirler 326 through the secondary fuel line 552. The fuel delivery system 800b of FIG. 4C also includes a secondary fuel pilot line 554 that conveys the secondary fuel 550 to the fuel nozzle 322.

A pilot fuel selection valve 720 located within the primary fuel line 512 and the secondary fuel pilot line 554 and may be configured to be actuated to one or more positions to adjust the flow to the fuel nozzle 322 of at least one of the primary fuel 510 and the secondary fuel 550. The pilot fuel selection valve 720 may be located proximate a primary fuel tank 518 in order to minimize or reduce the length of the primary fuel line 512 between the primary fuel tank 518 and the pilot fuel selection valve 720. In an embodiment, the pilot fuel selection valve 720 may be actuated to a primary fuel position that is configured to allow only the primary fuel 510 to flow to the fuel nozzle 322. No secondary fuel 550 will flow to the fuel nozzle 322 when the pilot fuel selection valve 720 is in the primary fuel position. The primary fuel position may be used during operation of the gas turbine engine 20 when enhanced stability of the combustor is required, such as, for example, combustor efficiency, emissions control, altitude ignition, control combustion dynamics, or lean blowout. In an embodiment, the pilot fuel selection valve 720 may be actuated to a secondary fuel position that is configured to allow only the secondary fuel 550 to flow to the fuel nozzle 322. No primary fuel 510 will flow to the fuel nozzle 322 when the pilot fuel selection valve 720 is in the secondary fuel position. It is understood that the pilot fuel selection valve 720 is not limited to the primary fuel position and the secondary fuel position and thus may be actuated to any position between the primary fuel position and the secondary fuel position.

In an embodiment, the primary fuel line 512 and the secondary fuel pilot line 554 may be combined into a combined pilot fuel line 560 between the pilot fuel selection valve 720 and the fuel nozzle 322. The secondary fuel position may be used to purge the combined pilot fuel line 560 of the primary fuel 510. Advantageously, since the pilot fuel selection valve 720 is located proximate to the primary fuel tank 518, the combined pilot fuel line 560 accounts for a majority of the primary fuel line 512. Therefore, when the pilot fuel selection valve 720 is actuated to the secondary fuel position and the secondary fuel 550 purges the combined pilot fuel line 560 and the majority, if not all, of the primary fuel 510 is removed from the primary fuel line 512.

The pilot fuel selection valve 720 may be modulated between the primary fuel position and the secondary fuel position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 800c of FIG. 4C is an active feedback system and may be configured to adjust the position of the pilot fuel selection valve 720 based upon a detection of operating conditions using a logic controller 740. The logic controller 740 may include one or more sensors 742 configured to detect operating conditions of the gas turbine engine 20 and/or operating conditions specifically of the combustion chamber 302.

The logic controller 740 may be in electronic communication with the pilot fuel selection valve 720 and a secondary fuel control valve 760. The logic controller 740 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The fuel delivery system 800C may also include the secondary fuel control valve 760 that is located within the secondary fuel pilot line 554 between the pilot fuel selection valve 720 and a second fuel secondary fuel tank 558. The secondary fuel control valve 760 may be configured to be actuated to one or more positions to adjust the flow of the secondary fuel 550 to the pilot fuel selection valve 720. The pilot fuel selection valve 720 may be located proximate the secondary fuel tank 558 in order to minimize or reduce the length of the secondary fuel line 552 between the secondary fuel tank 558 and the secondary fuel control valve 760. In an embodiment, the secondary fuel control valve 760 may be actuated to a secondary fuel on position that is configured to allow the secondary fuel 550 to flow the pilot fuel selection valve 720. In an embodiment, the secondary fuel control valve 760 may be actuated to a secondary fuel off position that is configured to prevent the secondary fuel 550 from flowing to the pilot fuel selection valve 720. It is understood that the secondary fuel control valve 760 is not limited to the secondary fuel on position and the secondary fuel off position and thus may be actuated to any position between the secondary fuel on position and the secondary fuel off position.

The secondary fuel control valve 760 may be modulated between the secondary fuel on position and the secondary fuel off position based upon operating conditions of the gas turbine engine 20. Operating conditions of the gas turbine engine 20 may include but are not limited to engine speed, fuel-to-air ratio, pressure, temperature, or any operating condition of a gas turbine engine 20 known to one of skill in the art. The fuel delivery system 800c of FIG. 4C is an active feedback system and may be configured to adjust the position of secondary fuel control valve 760 based upon a detection of operating conditions using the logic controller 740. The logic controller 740 may include one or more sensors 742 configured to detect operating conditions of the gas turbine engine 20 and/or operating conditions specifically of the combustion chamber 302.

Figure 5:
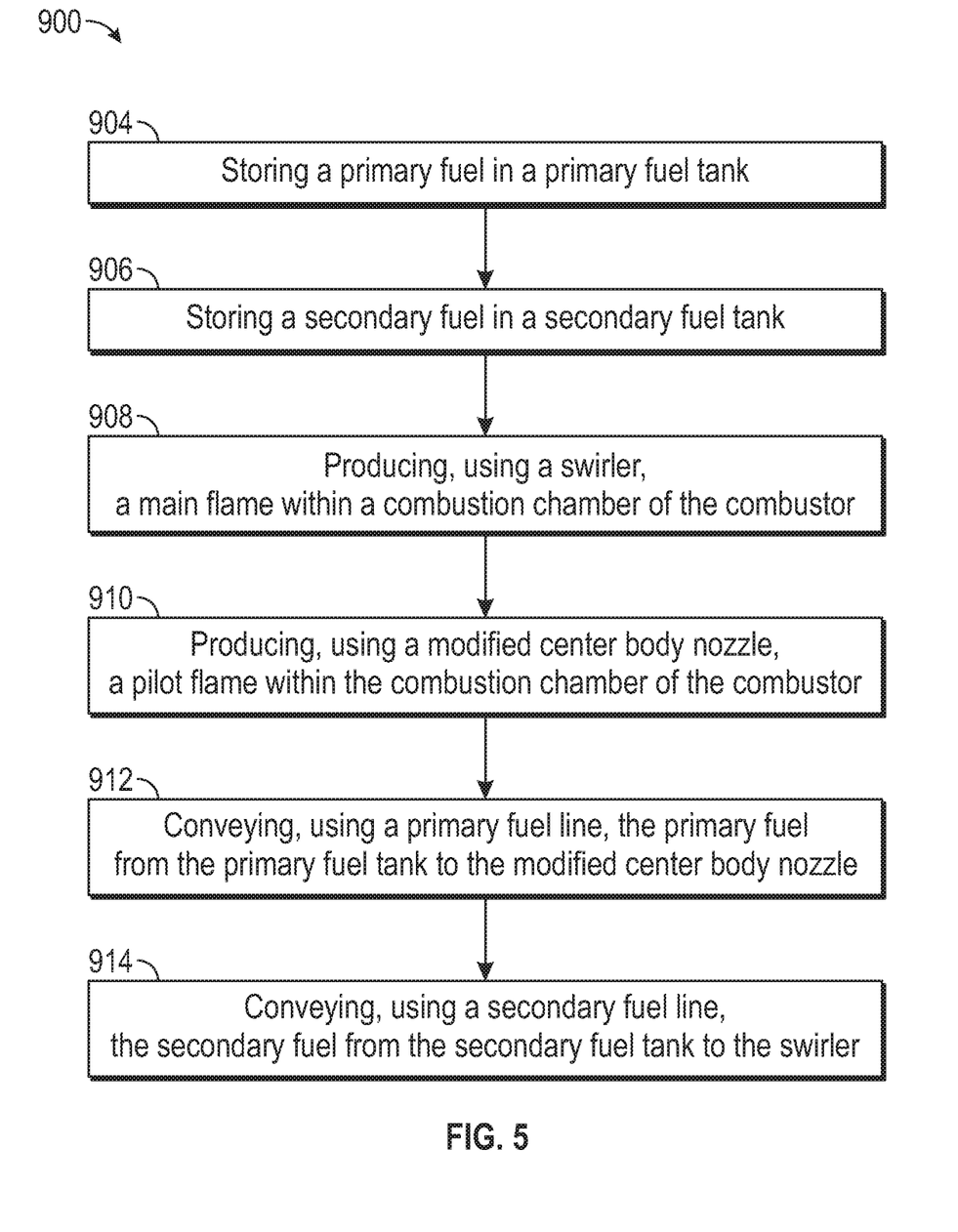
FIG. 5 is a flow chart of a method of delivering fuel to a combustor, in accordance with an embodiment of the present disclosure.

Referring now to FIG. 5, while referencing components of FIGS. 1, 2A, 2B, 3B, 3C, 4B, and 4C. FIG. 5 shows a flow chart of method 900 of delivering fuel to a combustor 300 of a gas turbine engine 20, in accordance with an embodiment of the disclosure. In an embodiment, the method 900 may be performed by a fuel delivery system 700B, 700C, 800B, 800C of FIGS. 3B, 3C, 4B, and 4C.

At block 904, a primary fuel 510 is stored in a primary fuel tank 518. At block 906, a secondary fuel 550 is stored in a secondary fuel tank 558. At block 908, a main flame 570 is produced within a combustion chamber 302 of the combustor 300 using a swirler 326. At block 910, a pilot flame 520 is produced within a combustion chamber 302 of the combustor 300 using a fuel nozzle 322. The fuel nozzle 322 comprises a nozzle outlet 323 that is located proximate to an end 328 of the swirler 326 or at the end 328 of the swirler 326. The end of the swirler 326 being located at an inlet 306 of the combustor 300. At block 912, the primary fuel 510 is conveyed from the primary fuel tank 518 to the fuel nozzle 322 using a primary fuel line 512. At block 914, the secondary fuel 550 is conveyed from the secondary fuel tank 558 to the swirler 326 using a secondary fuel line 552.

The method 900 may also comprise that a secondary fuel pilot line 554 conveys the secondary fuel 550 from the secondary fuel tank 558 to the fuel nozzle 322 and a pilot fuel selection valve 720 adjusts a flow to the fuel nozzle 322 of at least one of the primary fuel 510 and the secondary fuel 550.

The method 900 may further comprise that a combined pilot fuel line 560 conveys at least one of the primary fuel 510 and the secondary fuel 550 from the pilot fuel selection valve 720 to the fuel nozzle 322. The primary fuel line 512 and the secondary fuel pilot line 554 are combined into the combined pilot fuel line 560 between the pilot fuel selection valve 720 and the fuel nozzle 322.

The method 900 may yet further comprise that a position of the pilot fuel selection valve 720 is adjusted based upon a schedule of operating conditions when the fuel delivery system 700b, 800b is a passive system.

The method 900 may yet further comprise that a logic controller 740 adjusts a position of the pilot fuel selection valve 720 based upon detection of operating conditions. The logic controller 740 includes one or more sensors 742 configured to detect operation conditions of the gas turbine engine 20.

The method 900 may yet further comprise that a secondary fuel control valve 760 adjusts a flow of the secondary fuel 550 between the second fuel secondary fuel tank 558 and the pilot fuel selection valve 720. The logic controller 740 may adjust a position of the secondary fuel control valve 760 based upon detection of operating conditions.

While the above description has described the flow process of FIG. 5 in a particular order, it should be appreciated that unless otherwise specifically required in the attached claims that the ordering of the steps may be varied.

Technical effects of embodiments of the present disclosure include adjusting between delivery of a primary fuel and a secondary fuel to a nozzle of a combustor of a gas turbine engine while the secondary fuel may be simultaneously supplied to a swirler of the combustor.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel delivery system for a combustor of a gas turbine engine, the fuel delivery system comprising:
    a primary fuel tank configured to store a primary fuel;
    a secondary fuel tank configured to store a secondary fuel;
    a swirler configured to produce a main flame within a combustion chamber of the combustor;
    a fuel nozzle configured to produce a pilot flame within the combustion chamber of the combustor, wherein the fuel nozzle comprises a nozzle outlet that is located adjacent to an end of the swirler or at the end of the swirler such that combustion of the primary fuel to produce the pilot flame occurs outside of the swirler, the end of the swirler being located at an inlet of the combustor, wherein the end of the swirler is an axially aftmost end of the swirler with respect to a centerline of the combustion chamber, the fuel nozzle outlet is axially inline with a surface of an end wall of the end of the swirler, wherein the surface of the end wall extends along a radial direction with respect to the centerline;
a primary fuel line fluidly connecting the primary fuel tank to the fuel nozzle;
a secondary fuel line fluidly connecting the secondary fuel tank to the swirler, wherein the secondary fuel does not mix with the primary fuel until the secondary fuel has exited the swirler;
a secondary fuel pilot line fluidly connecting the secondary fuel tank to the fuel nozzle; and
a pilot fuel selection valve located within the primary fuel line and the secondary fuel pilot line, the pilot fuel selection valve being configured to be actuated to one or more positions to adjust a flow to the fuel nozzle of at least one of the primary fuel and the secondary fuel.

2. The fuel delivery system of claim 1, further comprising:
a combined pilot fuel line fluidly connecting the pilot fuel selection valve to the fuel nozzle, wherein the primary fuel line and the secondary fuel pilot line are combined into the combined pilot fuel line between the pilot fuel selection valve and the fuel nozzle.

3. The fuel delivery system of claim 1, wherein the fuel delivery system is a passive system and configured to adjust the position of the pilot fuel selection valve based upon a schedule of operating conditions.

4. The fuel delivery system of claim 1, further comprising:
a logic controller including one or more sensors configured to detect operation conditions of the gas turbine engine, the logic controller being in electronic communication with the pilot fuel selection valve,
wherein the fuel delivery system is an active feedback system and configured to adjust the position of the pilot fuel selection valve based upon a detection of operating conditions using the logic controller.

5. The fuel delivery system of claim 1, further comprising:
a secondary fuel control valve located within the secondary fuel pilot line between the second fuel secondary fuel tank and the pilot fuel selection valve, the secondary fuel control valve being configured to be actuated to one or more positions to adjust the flow of the secondary fuel to the pilot fuel selection valve.

6. The fuel delivery system of claim 5, further comprising:
a combined pilot fuel line fluidly connecting the pilot fuel selection valve to the fuel nozzle, wherein the primary fuel line and the secondary fuel pilot line are combined into the combined pilot fuel line between the pilot fuel selection valve and the fuel nozzle.

7. The fuel delivery system of claim 5, wherein the fuel delivery system is a passive system and configured to adjust the position of the pilot fuel selection valve based upon a schedule of operating conditions.

8. The fuel delivery system of claim 5, further comprising:
a logic controller including one or more sensors configured to detect operation conditions of the gas turbine engine, the logic controller being in electronic communication with the pilot fuel selection valve,
wherein the fuel delivery system is an active feedback system and configured to adjust the position of the pilot fuel selection valve based upon a detection of operating conditions using the logic controller.

9. The fuel delivery system of claim 8, wherein the logic controller is in electronic communication with the secondary fuel control valve and configured to adjust the position of the secondary fuel control valve based upon a detection of operating conditions.

10. The fuel delivery system of claim 1, the primary fuel is hydrogen.

11. A method of delivering fuel to a combustor of a gas turbine engine, the method comprising:
storing a primary fuel in a primary fuel tank of a fuel delivery system;
storing a secondary fuel in a secondary fuel tank;
producing, using a swirler, a main flame within a combustion chamber of the combustor;
producing, using a fuel nozzle, a pilot flame within the combustion chamber of the combustor, wherein the fuel nozzle comprises a nozzle outlet that is located adjacent to an end of the swirler or at the end of the swirler such that combustion of the primary fuel to produce the pilot flame occurs outside of the swirler, the end of the swirler being located at an inlet of the combustor, wherein the end of the swirler is an axially aftmost end of the swirler with respect to a centerline of the combustion chamber, the fuel nozzle outlet is axially inline with a surface of an end wall of the end of the swirler, wherein the surface of the end wall extends along a radial direction with respect to the centerline;
conveying, using a primary fuel line, the primary fuel from the primary fuel tank to the fuel nozzle;
conveying, using a secondary fuel line, the secondary fuel from the secondary fuel tank to the swirler, wherein the secondary fuel does not mix with the primary fuel until the secondary fuel has exited the swirler;
conveying, using a secondary fuel pilot line, the secondary fuel from the secondary fuel tank to the fuel nozzle; and
adjusting, using a pilot fuel selection valve, a flow to the fuel nozzle of at least one of the primary fuel and the secondary fuel.

12. The method of claim 11, further comprising:
conveying, using a combined pilot fuel line, at least one of the primary fuel and the secondary fuel from the pilot fuel selection valve to the fuel nozzle, wherein the primary fuel line and the secondary fuel pilot line are combined into the combined pilot fuel line between the pilot fuel selection valve and the fuel nozzle.

13. The method of claim 11, further comprising:
adjusting a position of the pilot fuel selection valve based upon a schedule of operating conditions, wherein the fuel delivery system is a passive system.

14. The method of claim 11, further comprising:
adjusting, using a logic controller, a position of the pilot fuel selection valve based upon detection of operating conditions, the logic controller including one or more sensors configured to detect operation conditions of the gas turbine engine.

15. The method of claim 11, further comprising:
adjusting, using a secondary fuel control valve, a flow of the secondary fuel between the second fuel secondary fuel tank and the pilot fuel selection valve.

16. The method of claim 15, further comprising:
conveying, using a combined pilot fuel line, at least one of the primary fuel and the secondary fuel from the pilot fuel selection valve to the fuel nozzle, wherein the primary fuel line and the secondary fuel pilot line are combined into the combined pilot fuel line between the pilot fuel selection valve and the fuel nozzle.

17. The method of claim 15, further comprising:
adjusting a position of the pilot fuel selection valve based upon a schedule of operating conditions.

18. The method of claim 15, further comprising:

adjusting, using a logic controller, a position of the pilot fuel selection valve based upon detection of operating conditions, the logic controller including one or more sensors configured to detect operation conditions of the gas turbine engine.

19. The method of claim 18, further comprising:

adjusting, using the logic controller, a position of the secondary fuel control valve based upon detection of operating conditions, the one or more sensors configured to detect operation conditions of the gas turbine engine.

20. The method of claim 11, wherein the primary fuel is hydrogen.

* * * * *